Jan. 22, 1929.  W. A. ROWE  1,699,719
HEATING APPARATUS
Filed Nov. 29, 1926  2 Sheets-Sheet 2
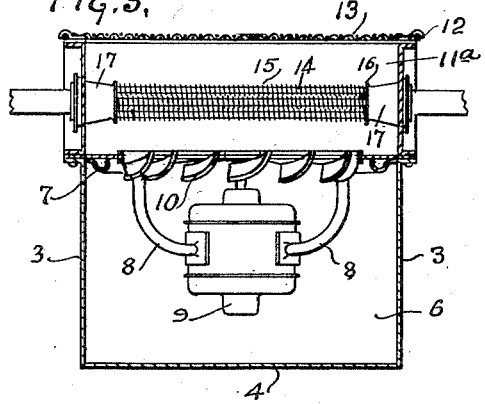
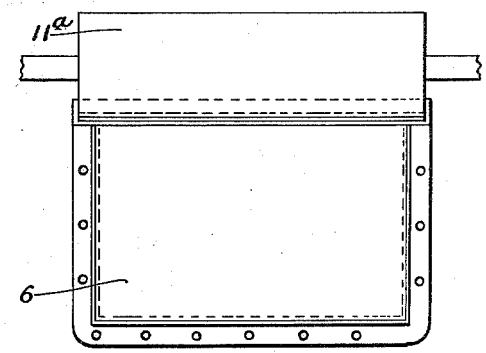
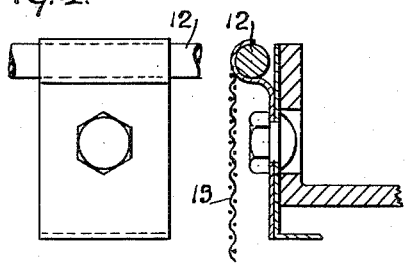
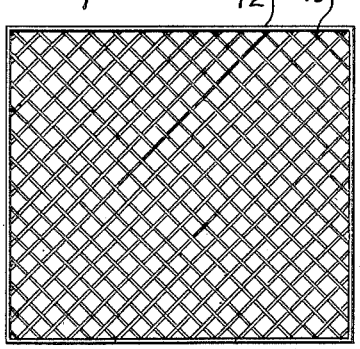
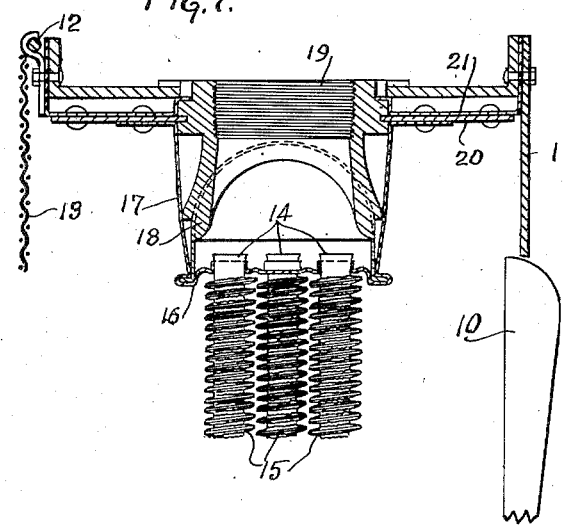
Inventor
WILLIAM A. ROWE,
By Toulmin & Toulmin,
Attorneys Patented Jan. 22, 1929.

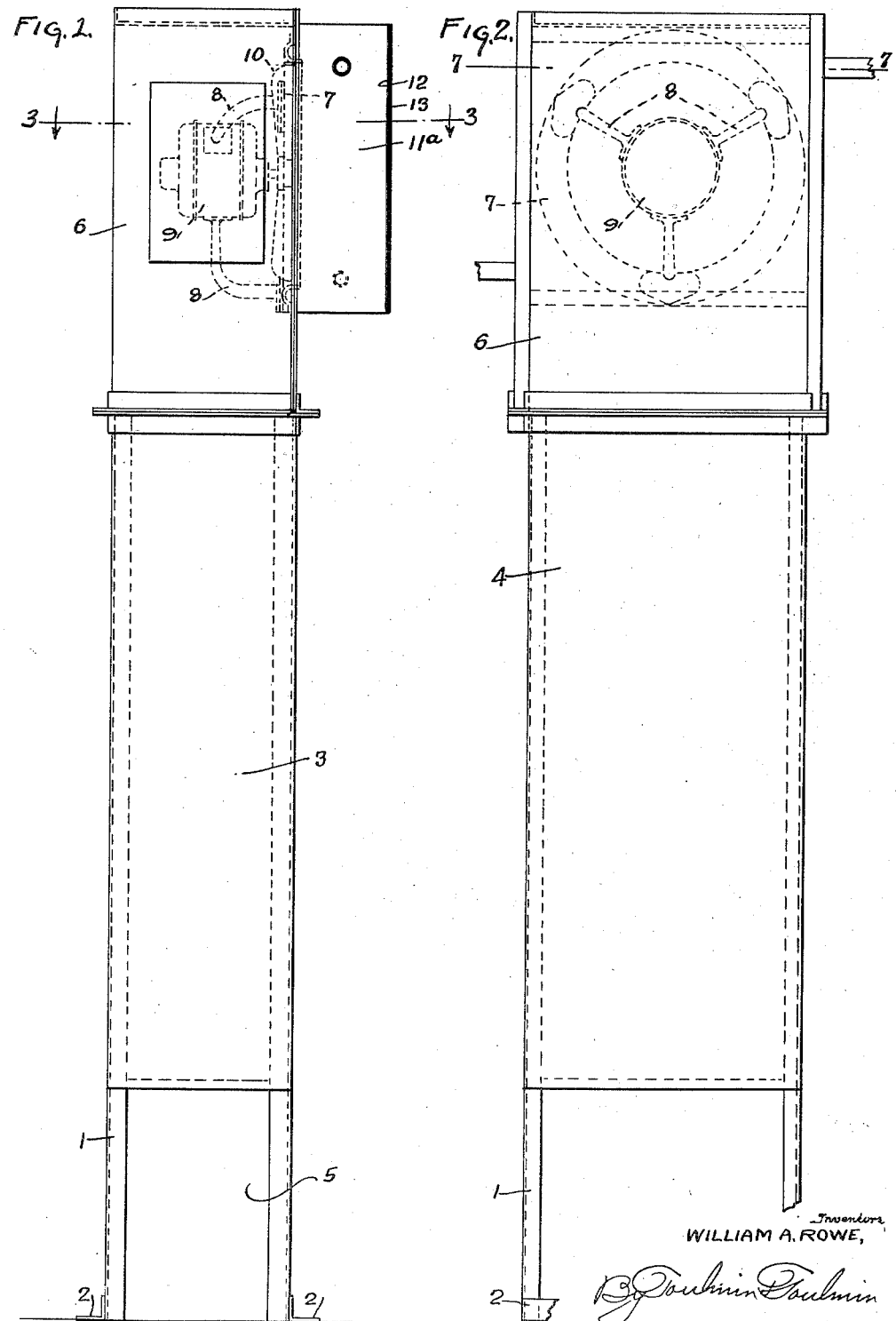

1,699,719

UNITED STATES PATENT OFFICE.

WILLIAM A. ROWE, OF DETROIT, MICHIGAN, ASSIGNOR, BY MESNE ASSIGNMENTS, TO AMERICAN BLOWER CORPORATION, OF DETROIT, MICHIGAN, A CORPORATION OF DELAWARE.

HEATING APPARATUS.

Application filed November 29, 1926. Serial No. 151,581.

My invention relates to a heating apparatus.

The object of my invention is to provide a unit heater, which will withdraw the cool air from the floor and discharge the air in heated condition at a very considerable elevation above the floor.

It is a further object of my invention to provide a heater, in which the fan is closely adjacent to the radiator, so that the air can be driven through the radiator with the maximum velocity and dispersion.

It is a further object of my invention to provide the radiator to one side of the incoming air passage-way, so that the maximum capacity of that passage-way may be utilized.

It is a further object of my invention to so locate the radiator on the outside of the unit that the heat therefrom may be radiated in a zone about the passage of the air.

It is a further object of my invention to provide a very narrow circulation box, which serves as a support for the radiator and fan, as well as a draft passageway and is of such narrow floor dimensions at the base that it will take up the minimum of floor space, while the maximum dimensions of the apparatus are located at the top thereof above the occupants of the room and the contents thereof.

My invention produces high heat efficiency of direct radiation with only one-tenth the weight of direct radiation and one-fourth the space of equivalent direct radiation, and involves much less time to install.

Referring to the drawings:

Figure 1 is a side elevation thereof;

Figure 2 is a front elevation thereof;

Figure 3 is a section on the line 3—3 of Figure 1, looking in the direction of the arrows;

Figure 4 is a detail of the screen clip;

Figure 5 is a detail of the screen;

Figure 6 is a top plan view of the unit;

Figure 7 is a section on the line 7—7 of Figure 2.

Referring to the drawings in detail, 1—1 designate uprights joined at the floor by transverse angle irons 2, thus forming a rectangular frame work which is of relatively great height and narrow transverse dimension. Preferably, the side plates 3 are not as wide as the front and back plates 4. The side and front plates are spaced above the floor as indicated, allowing an air entrance opening 5 to be formed. In some forms of the device only the front wall 4 is cut away to form this opening, while the other walls extend to the floor.

On the top of this frame work and casing is mounted a fan chamber generally designated 6 having an open front wall in which is mounted a fan supporting plate 7 carrying on the bracket arms 8 a motor 9 on the armature shaft of which is carried a fan 10 turning within this plate, which is struck up to form a fan casing extending from the periphery of the fan to the outer wall of the casing 6 and the edge of the radiator 11. This radiator is attached in front of the fan closely adjacent to it on the outside of the housing 6. It will be noted that it extends beyond the general dimensions of the supporting cabinet and the cabinet 6. It is adapted to radiate heat laterally as well as to distribute heat due to the forced draft of the fan passing therethrough at high velocity. The radiator is preferably of copper and brass consisting of that type known as "Aerofin", which is a series of nonferrous pipes each having mounted thereon a spiral, fluted fin.

On the front of the radiator casing is mounted in a frame 12 a coarse screen 13, which serves to protect the radiator and distribute the outgoing heated air.

The exact arrangement of this radiator will be seen in Figure 7.

14 refers to the tubes having the fluted fins 15. These tubes are mounted in a transverse supporting plate 16 at either end, which, in turn, is supported in a tubular angle supporting header 17. This header is supported on a cast brass tapping header hub 18 that is threaded at 19. This hub is provided with a key supporting tapping hub plate 20 mounted upon the casing 21.

The casing 21 is surrounded by an outside box 11ª forming the radiator supporting box.

It will be understood that I desire to comprehend within my invention such modifications as may be necessary to adapt it to varying conditions and uses.

Having thus fully described my invention, what I claim as new and desire to secure by Letters Patent, is:—

1. In combination, a relatively high and narrow air circulation passageway open at the bottom for the inlet of the air and open at its side at the top thereof for the exit of air, a fan suspended in said opening, and a radiator mounted on the outside of said passageway directly in front of said fan closely adjacent the radiator and parallel with its face, whereby the air is driven through the radiator at high velocity.

2. In combination, a circulation passageway adapted to take air from the floor and discharge it at the top above the floor, said passageway consisting of an air delivery unit and a fan housing and radiator supporting unit, a radiator and radiator casing suspended on the side of the last mentioned unit adjacent an opening therein, and a detachably supported fan housing plate carrying a motor and fan mounted in said opening adjacent said radiator.

3. In combination, a relatively narrow and tall air circulation passageway open at its bottom adjacent the floor and open on the side adjacent the top, a radiator suspended on the outside of this air circulation chamber adjacent said opening, a high speed fan suspended in said opening adjacent the radiator, said radiator consisting of a plurality of horizontally disposed pipes having spiral fins thereon, a header for said pipes at either side thereof, and a casing enclosing said header.

4. In combination, a relatively narrow and tall air circulation passageway open at its bottom adjacent the floor and open on the side adjacent the top, a radiator suspended on the outside of this air circulation chamber adjacent said opening, a high speed fan suspended in said opening adjacent the radiator, said radiator consisting of a plurality of horizontally disposed pipes having spiral fins thereon, a header for said pipes at either side thereof, and a casing enclosing said header, and a spaced screen mounted over the face of said radiator to protect it and disperse the outgoing heated air.

In testimony whereof, I affix my signature

WILLIAM A. ROWE